W. MEREDITH.
APPARATUS FOR DETERMINING THE VOLUME OF LIQUID IN TANKS.
APPLICATION FILED JAN. 10, 1916.
1,261,262.
Patented Apr. 2, 1918.
2 SHEETS—SHEET 2.
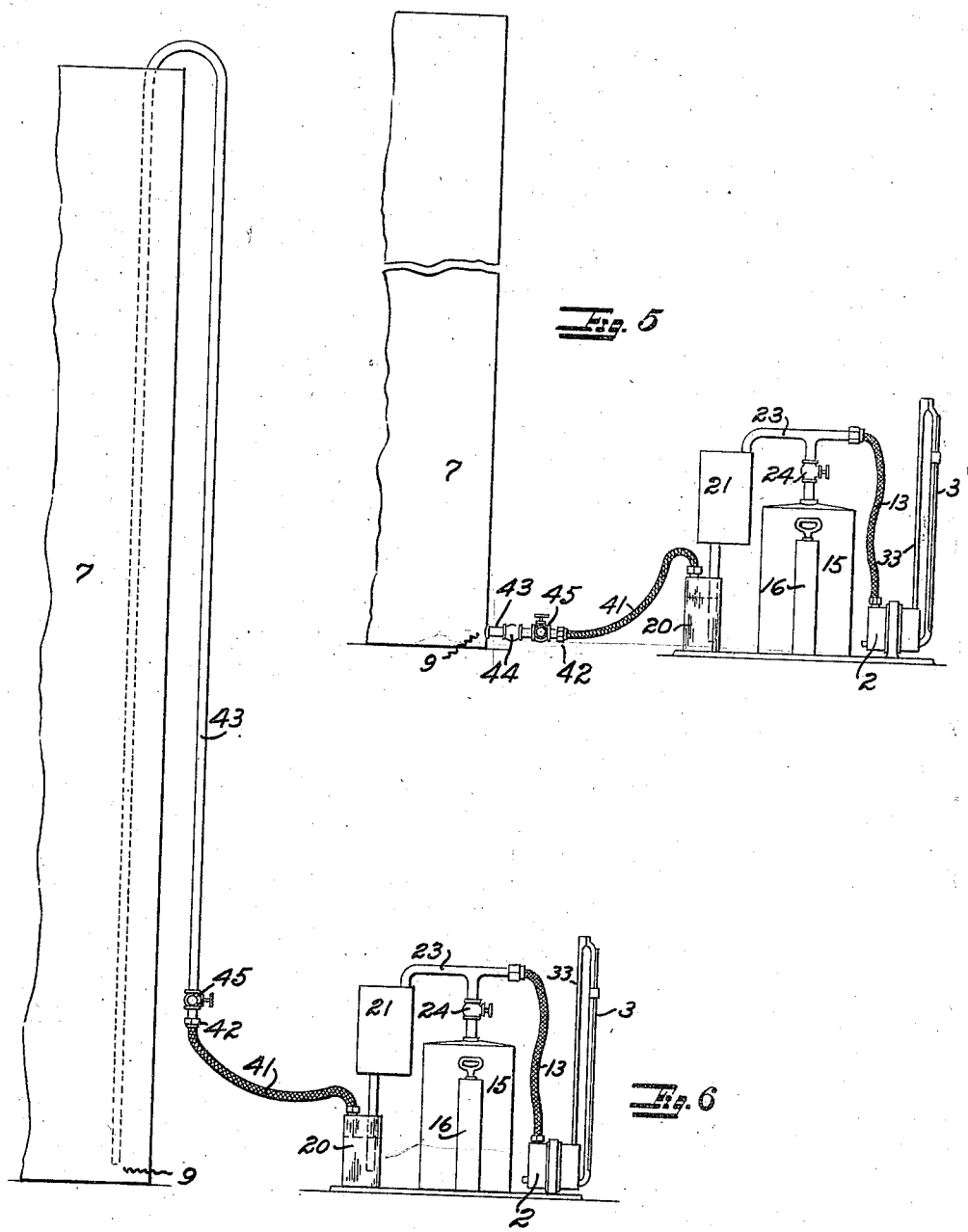
INVENTOR.
WYNN MEREDITH
BY
HIS ATTORNEYS.

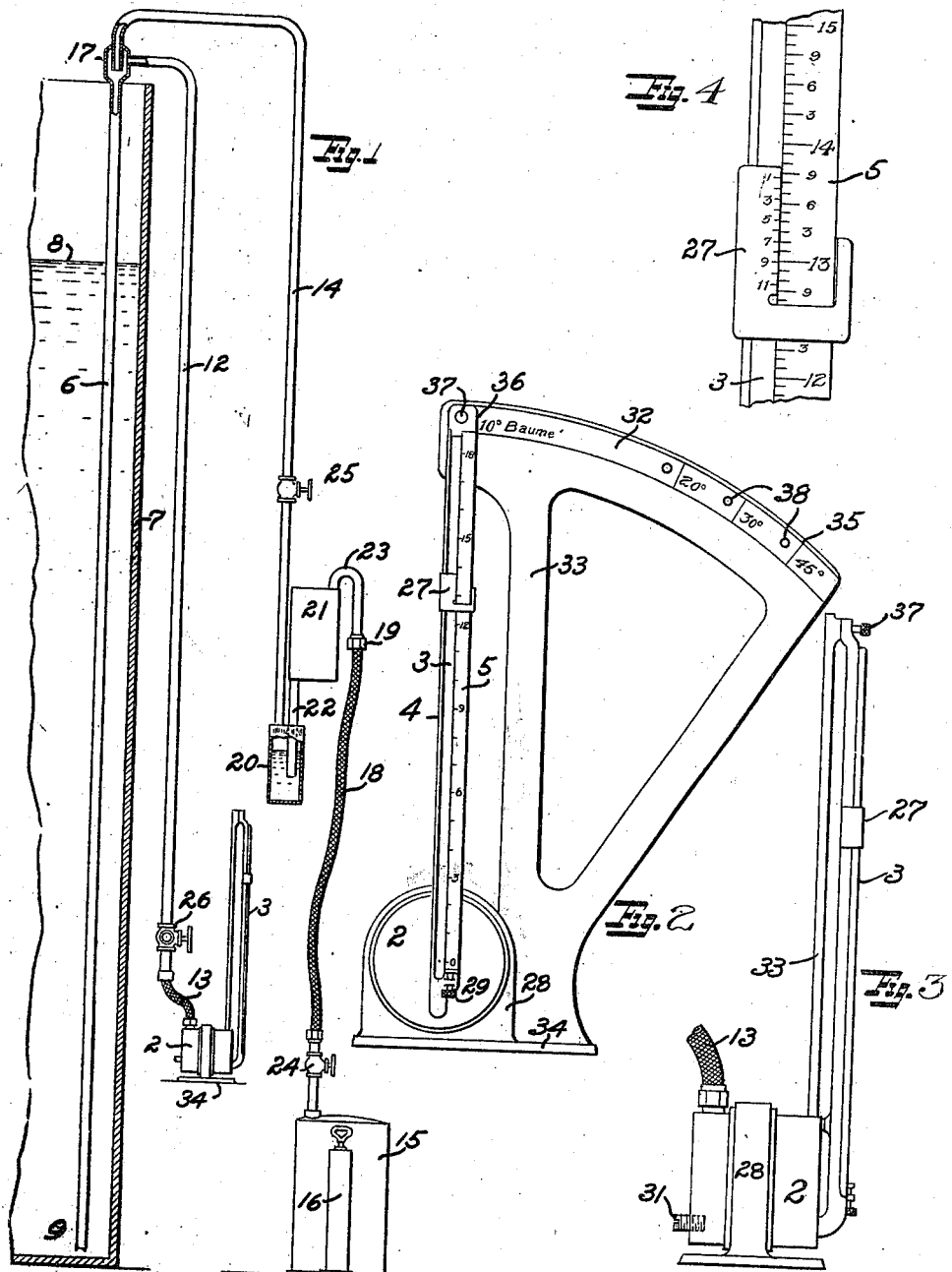

UNITED STATES PATENT OFFICE.

WYNN MEREDITH, OF SAN FRANCISCO, CALIFORNIA.

APPARATUS FOR DETERMINING THE VOLUME OF LIQUID IN TANKS.

1,261,262.

Specification of Letters Patent.

Patented Apr. 2, 1918.

Application filed January 10, 1916. Serial No. 71,173.

*To all whom it may concern:*

Be it known that I, WYNN MEREDITH, a citizen of the United States, and a resident of the city and county of San Francisco, State of California, have invented a new and useful Apparatus for Determining the Volume of Liquid in Tanks, of which the following is a specification.

The invention relates to an instrument of precision with which the volume of liquid in a tank may be determined.

The object of the invention is to provide an apparatus having a scale upon which may be read the quantity of liquid in the tank in terms of its height at a given temperature.

Another object of the invention is to provide an apparatus having a scale so that the height of liquid in the tank at a given standard temperature may be determined irrespective of the temperature obtaining at the moment of reading the scale.

Another object of the invention is to provide an apparatus of the character described for measuring liquids of different specific gravity.

Another object of the invention is to provide an apparatus of the character described which includes novel means for disclosing the proper operation of the apparatus.

The invention possesses other advantageous features, which, with the foregoing, will be set forth at length in the following description, where I shall fully explain that preferred form of my invention which is illustrated in the drawings accompanying and forming part of the specification. The novelty of the invention will be included in the claims succeeding said description. From this it is apparent that I do not limit myself to the showing made by the said drawings and description, as I may adopt many variations within the scope of my invention as set forth in the said claims.

Referring to the drawings:

Figure 1 is a vertical view of the apparatus of my invention applied to a tank, a fragment of which is shown in section. The size of the apparatus with reference to the size of the tank is greatly exaggerated.

Fig. 2 is a vertical view of one portion of the apparatus.

Fig. 3 is a vertical view of the same portion taken in a plane at right angles to that of Fig. 2.

Fig. 4 is a fragmentary view showing the scale and vernier.

Fig. 5 is a view showing a modified form of my invention.

Fig. 6 is a view showing another modified form of my invention.

My invention consists of an instrument of precision for ascertaining the volume of any liquid held in a storage tank or receptacle by the height on a graduated scale to which a column of heavier liquid is raised by the head of liquid in the tank. The apparatus is adapted for use with any liquid, but its use particularly in connection with oils is shown and described herein.

In transactions involving the selling or handling of oil, the volume of an oil of a given specific gravity is estimated on the basis of its volume at a certain temperature, usually 60° Fahrenheit. In determining the amount of oil in a storage tank which is necessarily exposed to changes in temperature it is required to do more than merely measure the depth of the oil, since the depth varies with the expansion and contraction of the oil due to changes in temperature. The mass of the stored oil is not subject to fluctuation with changes of temperature and remains a constant for any given quantity of oil whether the oil is warm or cold, therefore a measuring apparatus which is sensitive only to the mass of the liquid is beyond reach of temperature changes and equally reliable at all temperatures. By calibrating the apparatus for oil at, say 60° Fahrenheit, the quantity of oil measured may be disclosed in terms of its volume at that temperature, regardless of the actual temperature existing at the moment of measurement. A still greater usefulness is given the apparatus by providing means so that oils of different specific gravity can be measured from the same scale.

A closed vessel 2 is provided with an upwardly extending glass tube 3 open at its upper end. The lower end of the tube is connected by a passage with the lower portion of the vessel and a suitable support 4 protects the tube and in effect constitutes with the tube and the vessel an integral structure. The vessel contains a quantity of liquid, preferably mercury, into the lower portion of which leads the passage from the tube, so that variations in pressure within the vessel are accompanied by variations in the height of the mercury within the tube. The capacity of the vessel 2 is relatively quite large with respect to that of the tube 3 so that a displacement of some of the mercury into the tube does not sensibly affect the level of the mercury in the vessel. Arranged adjacent to the tube 3 is a graduated scale 5 upon which the height of the mercury column in the tube may be conveniently read.

Means are provided for producing pressure within the mercury containing vessel which is equal to the pressure head of the liquid in the tank. A pipe 6 is arranged in the storage tank 7 and extends down through the liquid 8 therein its end 9 opening closely adjacent to the bottom. A conductor 12 connects this pipe with the mercury vessel, that portion of it 13 next to the mercury vessel being flexible.

Connected to the pipe 6 is a second conductor 14 which conveys air into the pipe 6 from the compressed air tank 15 supplied from the hand pump 16. The connection 17 of the conductor 14 to the pipe 6 is arranged so that moisture condensing in the conductor will not run down the pipe 12 into the mercury vessel 2.

A flexible connection 18 detachable at the coupling 19 connects the air tank 15 with two connected vessels 20 and 21 interposed between the tank and the conductor 14. The vessel 20 is a closed glass tube partially filled with kerosene or comparable liquid. The conductor 14 is connected into the top of the tube 20. A conductor 22 extending well below the surface of the liquid in the tube connects with the bottom of the closed chamber 21 and the conductor 23 connected into the top of the chamber 21 connects through the coupling 19 with the flexible conductor 18. Valves 24 and 25 control the passage of air from the tank into the conductor 18 and through the conductor 14 respectively. A valve 26 gives communication between the vessel 2 and the conductor 12 and this valve may be turned so as to close conductor 12 while establishing communication between the vessel 2 and the outer air.

Assume that the storage tank 7 contains a quantity of oil 8 which it is desired to measure and that the gravity of the oil is 10° Baumé. Assume no pressure in the apparatus, the oil in the immersed section of pipe 6 standing at the same level as the oil in the tank. Assume also that the scale 5 is calibrated to oil of 10° Baumé gravity at a temperature of 60° Fahrenheit and that the tube 3 is in the vertical position shown in Fig. 2. The scale may be marked in feet, the number which represents the maximum depth of oil in the tank appearing near the top of the tube. Since in a tank of given size each foot of depth represents a certain number of barrels, the scale may be marked, if desired, so that the height of the mercury column is evaluated in that unit instead of in feet. In the drawings the scale 5 is shown marked from 0 to 18 feet, the latter being assumed to be the maximum depth of oil. In practice, the tube 3 is extended a short distance above the scale marking for the maximum depth.

The operation of the apparatus is as follows: The valve 26 is opened to connect the vessel 2 with the conductor 12, and the valves 25 and 24 opened in the order named to supply air under pressure to the conductor 18. The air passes through the conductors 18 and 23, the chamber 21 and the conductor 22 and bubbles up through the liquid in the tube 20 before entering the conductor 14. The operator is thus able to determine whether or not air is passing through the conductors. From the conductor 14 the air passes into the pipe 6 and forces the oil in the submerged section of the pipe downwardly until the pipe is clear and air bubbles out at the bottom end 9. Whatever pressure is exerted to expel the column of oil from the pipe 6 must of necessity be exerted also in the other connecting conductors and therefore upon the mercury in the vessel 2. This pressure displaces a certain amount of the mercury which flows out into the tube 3 and rises therein to a point where it balances the pressure of the air in the mercury vessel. The degree of air pressure necessary to keep the pipe 6 clear of oil is represented by the weight of the oil column in the pipe before the pressure is applied, that is, the pressure head in the tank. Therefore, the depth of the oil bears a direct relation to the height of the mercury in the tube and since the scale is calibrated for the volume of oil at 60° Fahrenheit and since the mass of the oil is not affected by temperature, the reading of the scale gives the depth of the oil in the tank as it would be if the temperature were at 60° Fahrenheit irrespective of the actual temperature and the actual depth.

The sight feed tube 20 provides means for the operator to tell whether the oil has been forced out of the pipe 6 and if the scale reading is correct, or whether an obstruction is blocking the pipe, or whether there is sufficient air pressure to clear the pipe. If the mercury column remains at a constant height and air is passing as shown by bubbles rising in the liquid of the sight feed tube 20, the operator is certain that the tube 6 is clear and the air escaping from the bottom end 9.

A vernier 27 is arranged on the scale 5 so that a very close reading of the height of the mercury column is possible. Fig. 4 shows a fragment of the tube 3 and the scale 5 and the vernier 27 full size. The position of the vernier indicates that the depth of oil in the tank is 13 feet 9 7/12 inches.

It has been assumed that the oil has a gravity of 10° Baumé and that the tube in its vertical position is calibrated for that gravity. Let it now be assumed that the oil in the tank has been replaced by a lighter oil, say of 45° Baumé. The relative weight of oils of 45° Baumé and 10° Baumé gravity is approximately as .8 to 1, therefore with the tube 3 in the vertical position the scale would be inaccurate for 45° Baumé oil and for the reading shown in Fig. 4 the depth would actually be as much greater than 13 feet 9 7/12 inches as 1 is greater than .8. In order to provide for measuring oils which may be of different gravities and be able to read accurately their depth on the same scale, the mercury vessel 2 is mounted in a suitable bearing 28 so that it, together with the tube 3 and the scale 5 may be rotated or rocked in the bearing to different angular positions. The bearing 28 is arranged so that the axis of rotation of the vessel lies in the normal level of the mercury in the vessel and the scale 5 is placed on the tube support 4 with the zero reading on the scale set accurately on the axis of rotation of the vessel and tube. The scale may be made adjustable on the tube support by means of the thumb screw 29 so that any inaccuracy in the setting of the scale may be remedied. Means are also provided for adjusting the level of the mercury so that its normal level lies in the axis of rotation and fills the tube to the zero reading on the scale. A plug 31 projecting into the lower portion of the vessel 2 is threaded into the wall of the vessel and by screwing the plug in, mercury is displaced thereby and the level raised. Similarly, turning the plug in the opposite direction lowers the level of the mercury. By this means the level of the mercury is brought exactly to the zero reading of the scale before the instrument is put into use and accuracy of the reading is assured.

An angular scale 32 is mounted on the frame 33 secured to the base 34 on which the bearing 28 is placed and a line 35 is marked on the scale 32 with which the edge 36 of the scale 5 is swung into alinement. The position of this line for 45° Baumé oil is obtained as follows: Oil of 45° Baumé gravity has a specific gravity of approximately .8. If then the tube is moved through the angle of which .8 is the cosine, that is, an angle of 36°—52′, then the reading of the scale in the inclined position actually represents the depth of the oil in the tank. Expressed in another way, the scale with a value of 1 in the vertical position is tipped over to an angular position of which .8 is the vertical component, thus shortening the scale divisions to .8 of their vertical value, but since the oil is but .8 of the specific gravity of that for which the scale is calibrated, the scale readings are the same and are accurate for both oils.

Other divisions on the angular scale may be marked corresponding to the angular position of the tube when used to measure the depth of oil of other densities. A taper pin 37 in suitably spaced holes 38 or other similar means, may be used to secure the tube in any of its positions.

After the depth of oil has been ascertained, the valves 25 and 26 are turned to seal the air under pressure in the conductors 6, 12 and 14 so that at the next measuring, the column of oil does not have to be wholly displaced from the pipe 6. The air then exhausts from the vessel 2 and the mercury in the tube falls back into the vessel. The portable air tank and pump is then disconnected from the apparatus and the operator proceeds to the next tank.

The presence of the valve 25 and the sealing of the conductors is optional and I may prefer to omit these features, allowing the air to exhaust from the conductors as well as from the mercury vessel after each measuring operation. In this case, the pipe 6 fills up with oil after each test and this column of oil is wholly displaced with each new test. In case the operator should disconnect the coupling 19 before closing the valve 25, the air in the various conductors forces the liquid in the tube 20 up through the conductor 22 into the chamber 21 bubbling through it in that chamber until an equilibrium is established when the liquid drains back into the tube 20. The chamber 21 is, therefore, merely a precautionary device to prevent a careless operator from allowing the sight feed to be emptied by the exhausting air.

In Fig. 5, a modification of my invention is shown somewhat in diagrammatical form. In this construction it is contemplated that the pump, sight feed, mercury vessel and scale will constitute the portable unit instead of only the air pump as in Fig. 1 and that the only portions of the apparatus to be permanently attached to the tank are the pipe connections. It will be understood that for convenience, the pump, sight feed, mercury vessel and scale may be suitably mounted in any desired way to facilitate their transportation and use.

The air tank 15 is connected through branch conductors 23 and 13 to the safety chamber 21, and the mercury vessel 2 respectively. The valve 24 controls the passage of the air from the tank 15 and the conductor 13 is flexible so as not to interfere with the rocking of the mercury vessel. A flexible conductor 41 attached to the sight feed tube 20 and provided with a coupling 42 provides means for connecting up the apparatus with the pipe 43 which is permanently attached to the tank. The pipe 43 is connected to the tank 7 and its open end 9 is closely adjacent the bottom of the tank. The pipe is provided with an automatic check valve 44 to prevent the accidental passage of oil outwardly in the pipe, and also a 3-way valve 45 for closing the pipe, and for establishing communication with the open air.

When the apparatus is connected up at the coupling 42 and the valves 45 and 24 are opened, the air passes through the conductor 23, chamber 21, tube 20, flexible conductor 41 and into the pipe 43. As soon as the air pressure in the pipe is greater than the head of oil in the tank 7, the air will pass through the check valve and bubble out at the opening 9. The operator is informed relative to the passing of air through the pipe by the sight feed tube 20 as previously explained. Obviously whatever pressure obtains in the conductors 23 and 13 is effective in displacing mercury from the vessel 2 into the tube 3 as heretofore explained in detail, and the volume of oil in the tank is read upon the scale in the manner previously made clear.

Fig. 6 shows another modification quite similar to the one shown in Fig. 5 but differing in the manner of connecting to the tank. The apparatus of the "portable unit" is the same as that just described, but the pipe 43 is led upward over the top edge of the tank and down through the liquid as shown. An automatic check valve is not needed in this construction, although it may be included as a precaution against malicious mischief, but the valve 45 is included, which provides means whereby the air may be sealed in the pipe 43 after the first application of the apparatus, thus making it unnecessary to displace the column of oil from the immersed section of the pipe with each use of the apparatus. After finishing a test the valve 24 is closed to shut off the air and the valve 45 is turned to seal the pipe 43 and place the conductor 41 and connected conductors in communication with the atmosphere. This releases the pressure in the conductors of the portable unit and allows the mercury in the tube 3 to fall back into the mercury vessel. The coupling 42 is then disconnected.

I claim—

1. In combination with a tank containing liquid, a closed vessel containing mercury having a tube upwardly extending from below the level of the mercury in the vessel, a conductor in communication with said vessel and extending through said liquid, means for simultaneously displacing the column of liquid in said conductor and a proportional amount of mercury from said vessel into said tube and means angularly adjustable in accordance with the specific gravity of the liquid in the tank for evaluating the said displaced columns.

2. In combination with a tank containing liquid, a vessel containing mercury, a transparent tube extending from said vessel, a conductor in communication with said vessel and extending through said liquid to the bottom thereof, means for simultaneously displacing the column of liquid in said conductor and a proportional amount of the said mercury from the vessel into said tube and angularly adjustable means for evaluating the height of the mercury column.

3. In an apparatus as described, a closed vessel containing a liquid and having a tube extending therefrom, an angular scale adjacent the tube, a linear scale adjacent the tube, said tube and linear scale being angularly adjustable across said angular scale for liquids of different specific gravities, means for adjusting said linear scale and means for displacing liquid from said vessel into said tube.

4. In combination with a tank containing liquid, a closed vessel containing mercury and having a tube extending therefrom, a linear scale adjacent said tube, an angular scale adjacent said tube, said tube and linear scale being arranged to be swung across the angular scale, a conductor in communication with said vessel and extending from the top to the bottom of said tank, and means for forcing air into said conductor.

5. In combination with a tank containing liquid, a closed vessel containing mercury and having a tube extending therefrom, a linear scale adjacent said tube, an angular scale adjacent said tube, said tube and linear scale being arranged to be swung across the angular scale, a conductor in communication with said vessel and extending from the top to the bottom of said tank, means for forcing air into said conductor, and a pressure release valve in said conductor.

6. In an apparatus for determining the volume of a liquid in a tank, a closed vessel containing mercury and having a tube extending therefrom, a linear scale and angular scale adjacent the tube, said linear scale and tube being adjustable across the angular scale for liquids of different specific gravities, a conductor in communication with said vessel and extending to the bottom of said tank, means for forcing air into said conductor, and means for determining the passage of air into said conductor.

7. In an apparatus as described, a base, a vessel containing mercury pivotally mounted on said base, and a tube extending from said vessel having a graduated scale, the axis of the pivot of said vessel passing through the tube opposite the zero reading of the graduation on said scale.

8. In an apparatus as described, a pivoted vessel containing mercury, a tube extending from said vessel having a graduated scale, the axis of the pivot of said vessel passing through the tube opposite the zero reading of the graduation of said scale, angular graduations adjacent said tube, and means for securing the tube in inclined position at points on said angular scale.

9. In combination with a tank containing liquid, a vessel containing liquid of a relatively higher specific gravity and provided with an upwardly extending angularly adjustable glass tube, a scale for gaging the angular adjustment of said tube, a conductor arranged between said tank and said vessel, means for producing a pressure in said conductor and said vessel equal to the pressure head in said tank and means for evaluating the column of liquid displaced from said vessel into said tube.

10. In an apparatus for measuring the volume of a liquid in a tank, a vessel containing another liquid of a relatively higher specific gravity and provided with an upwardly extending tube, means connecting said tank and said vessel whereby the pressure head in said tank displaces liquid from said vessel into said tube and means angularly adjustable in accordance with the specific gravity of the liquid in the tank for evaluating the displaced liquid in said tube.

11. In combination with a tank containing liquid, a closed vessel containing mercury and having a tube extending therefrom, a scale adjacent said tube, a conductor in communication with said vessel and extending to the bottom of the liquid in said tank, means for supplying air under pressure to said conductor, a liquid containing chamber for determining the passage of such air into said conductor and means for preventing the loss of liquid from said chamber.

In testimony whereof, I have hereunto set my hand at San Francisco, California, this 3rd day of January, 1916.

WYNN MEREDITH.

In presence of—
H. G. PROST.